United States Patent [19]

Iikura

[11] Patent Number: 5,517,958
[45] Date of Patent: May 21, 1996

[54] CYLINDER HEAD GASKET

[75] Inventor: Masahiko Iikura, Iwata, Japan

[73] Assignee: Yamaha Hatsudoki Kabushiki Kaisha, Iwata, Japan

[21] Appl. No.: 328,684

[22] Filed: Oct. 25, 1994

[51] Int. Cl.$^6$ .................................................. F02F 11/00
[52] U.S. Cl. ................................ 123/193.3; 277/206 R; 277/235 B
[58] Field of Search .......................... 123/193.3, 193.2, 123/193.5; 277/180, 235 B, 205, 206 R

[56] References Cited

U.S. PATENT DOCUMENTS

| | | | |
|---|---|---|---|
| 1,721,325 | 7/1929 | Wilson | 277/180 |
| 3,285,632 | 11/1966 | Dunkle | 277/206 R |
| 3,519,278 | 7/1970 | Fuhrmann et al. | 277/235 B |
| 3,561,776 | 2/1971 | Wilson | 277/206 R |
| 4,261,584 | 4/1981 | Browne et al. | 277/206 R |
| 4,417,503 | 11/1983 | Izumi | 277/205 |
| 4,739,999 | 4/1988 | Ishii et al. | 277/235 B |
| 4,791,891 | 12/1988 | Kubis et al. | 123/193.2 |
| 4,807,892 | 2/1989 | Udagawa | 277/235 B |

FOREIGN PATENT DOCUMENTS 2239496  7/1991  United Kingdom ............... 277/206 R

*Primary Examiner*—Marguerite Macy
*Attorney, Agent, or Firm*—Knobbe, Martens, Olson & Bear

[57] ABSTRACT

A number of embodiments of cylinder head gaskets wherein the gasket is formed in such a way as to provide an effective seal and, at the same time, avoid any side loading on the member in which the cylinder head gasket groove is formed. In some embodiments, the groove is formed by a pair of transversely spaced walls that extend around the cylinder bore and the height of the inner wall is greater than that of the outer wall so as to ensure that the cylinder head and cylinder block will mate with each other immediately adjacent the cylinder bore.

22 Claims, 3 Drawing Sheets

CYLINDER HEAD GASKET

BACKGROUND OF THE INVENTION

This invention relates to a cylinder head gasket and more particularly to an improved sealing arrangement for the seal around the cylinder bore of a reciprocating machine such as an internal combustion engine.

As is well known, most engines are comprised of a cylinder block having one or more cylinder bores and a cylinder head which is affixed to the cylinder block and which closes the cylinder bore. There is conventionally positioned some form of head gasket between the cylinder head and the cylinder block and around the cylinder bores for effecting a seal.

A type of cylinder head gasket frequently utilized for this purpose has certain disadvantages, which may be best understood by reference to FIG. 1 which shows a conventional prior art type of construction of this nature. Only a portion of the cylinder block is shown, but this is believed to be all that is necessary for those skilled in the art to understand the problems with the prior art type of construction.

In this construction, a cylinder block, indicated generally by the reference numeral 11, has a pair of liners 12 inserted therein and which form respective cylinder bores 13. The cylinder block 11 has an upwardly extending portion 14 that defines a shoulder into which cylindrical projections 15 of the cylinder liner extend. The cylinder liners 12 have recesses 16 formed above these projections 15, and these recesses 16 along with the cylinder block portion 14 form a recess in which cylinder head gaskets 17 are positioned.

In the illustrated embodiment, the cylinder head gaskets 17 are formed as annular members from a suitable sealing material. That is, there is one cylinder head sealing gasket 17 for each cylinder bore 13. In their uncompressed state, the cylinder head gaskets 17 extend above the upper deck of the cylinder block and cylinder liners by a distance indicated at Δt. When the cylinder head is affixed to the cylinder block 11, there will be a downward force, indicated by the arrow P, exerted on the gasket 17 so as to compress them in the grooves formed by the recesses 16 and the ledge 14 of the cylinder block 11.

The material employed for the cylinder head gasket 17 is, like most material, substantially incompressible. Therefore, if the volume of the gasket 17 is greater than the volume of the area between the groove 16 and the cylinder wall portion 14, the gasket 17 when compressed will place a force on the upper end of the cylinder liners 12, causing them to deflect, as shown in the broken-line portion of this figure. This distortion, even though it may be quite small, nevertheless gives rise to problems which should be obvious to those skilled in the art.

It is, therefore, a principal object of this invention to provide an improved cylinder head gasket arrangement which will provide effective sealing but which will not cause any side forces on the member in which it is received which would cause that member to deflect.

It is a further object of this invention to provide an improved cylinder head gasket arrangement for an engine or other reciprocating type of machine.

SUMMARY OF THE INVENTION

A first feature of this invention is adapted to be embodied in a cylinder head gasket for sealing around a cylinder bore formed in a cylinder block and a cylinder head affixed to the cylinder block in closing relationship to the cylinder bore. At least one of the cylinder head and cylinder block define a cylindrical groove in which the gasket is compressed. The cylinder head gasket has a cylindrical shape complementary to the groove for receipt therein and has an open cross section for deformation upon sealing engagement with the cylinder head and cylinder block without placing a side thrust on the wall of the groove surrounding the cylinder bore.

Another feature of the invention is also adapted to be embodied in a cylinder head gasket for sealing around a cylinder bore formed in a cylinder block and a cylinder head is affixed to the cylinder block in closing relation to the cylinder bore. At least one of the cylinder head and cylinder block define a cylindrical groove in which the gasket is compressed. In accordance with this feature of the invention, the gasket has an uncompressed height that is greater than the groove and an effective volume that is less than the closed volume of the groove when the cylinder head and cylinder block are engaged with each other for avoiding the gasket from exerting side thrust on the member in which the groove is formed.

DETAILED DESCRIPTION OF THE PREFERRED EMBODIMENTS OF THE INVENTION

Figure 1:
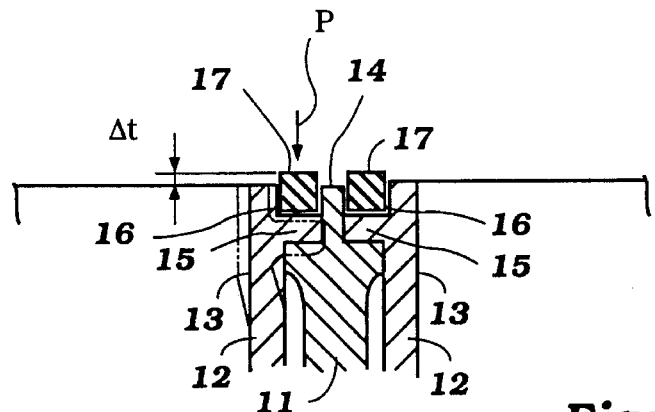
FIG. 1 is a cross-sectional view taken through a pair of adjacent cylinder bores with the cylinder head gaskets in place of a prior art type of construction.

Referring first to the embodiment of FIGS. 2 and 3, except for one major difference which will be noted, the basic construction of the cylinder block 11 and cylinder liners 12 and the formation of the grooves, indicated by the reference numeral 21, in which the cylinder head gaskets are received, is the same as the prior art construction, and for that reason those same or similar components have been identified by the same reference numerals and will be described again only insofar as is necessary to understand the construction and operation of this embodiment.

Figure 2:
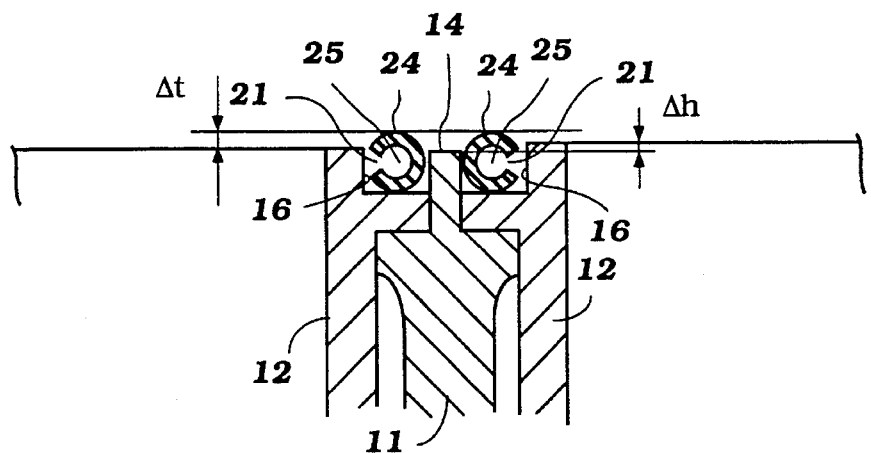
FIG. 2 is a cross-sectional view, in part similar to FIG. 1, and shows a first embodiment of the invention with the gasket in place and before the cylinder head is installed.

In this embodiment, the upwardly extending portion 14 of the cylinder block 11 has a lesser height than the upper ends of the liners 12, this height difference being indicated by the dimension Δh in FIG. 2. This is done so that when the cylinder head, shown in FIG. 3 and indicated by the reference numeral 22, is installed, the cylinder head 22, and specifically the surface surrounding its combustion chamber recesses 23, will contact the cylinder liners 12. With the prior art type of construction as shown in FIG. 1, there is a danger that the cylinder block surface 14, rather than the cylinder liners 12, will be engaged first by the cylinder head 22, and this can cause sealing gaps and combustion pressure leakage or worse.

In this embodiment, cylinder head gaskets 24 are positioned in each of the cylinder grooves 21. The gaskets 24 are formed from any suitable material normally used in this type of application, but have hollow interiors 25 so that the gaskets 24 in effect have a tubular type of construction. In this particular embodiment, the gaskets 24 have a generally C-shaped cross section. As installed, the gaskets 24 have a height that is slightly greater than that of the groove 21, and thus the gaskets 24 extend a height Δt above the upper surface of the cylinder liners 12.

Figure 3:
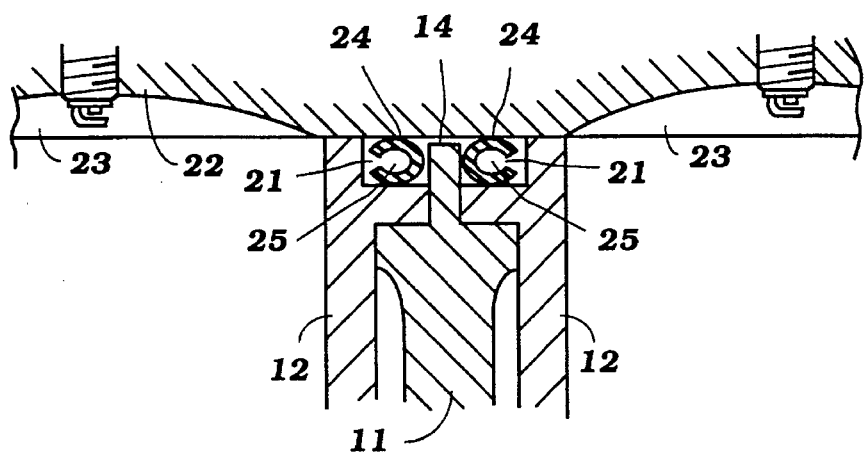
FIG. 3 is a cross-sectional view, in part similar to FIG. 2, and shows the construction after the cylinder head has been installed and the gasket compressed.

Thus, when the cylinder head 22 is installed, the cylinder head gaskets 24 will be compressed, as shown in FIG. 3. However, because of their tubular construction they will not place any side force on the cylinder liners 12. In addition, the volume of the material of the gaskets 24 is less than the volume of the gap 21 so that there will be further insurance against any side thrust on the liners 12 when the gaskets 24 are compressed. However, there is no loss in effectiveness of the seal.

Figure 4:
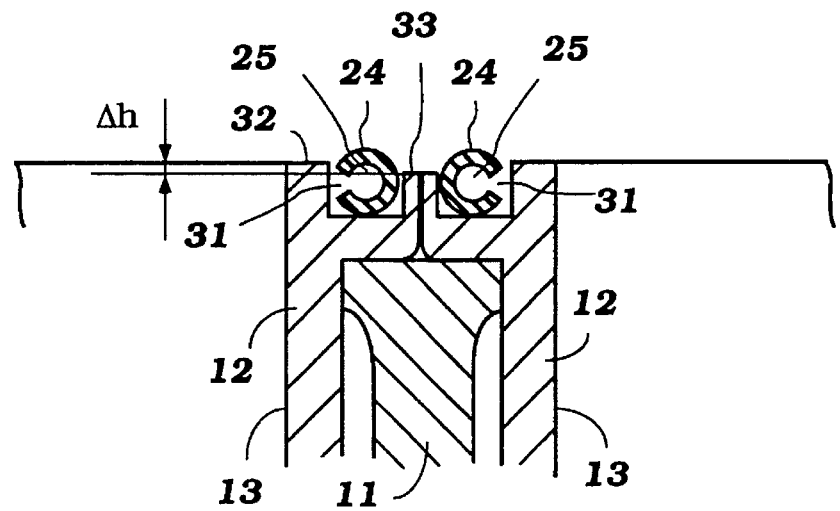
FIG. 4 is a cross-sectional view, in part similar to FIG. 2, and shows a second embodiment of the invention.

FIG. 4 shows another embodiment of the invention which is generally the same as the embodiment of FIGS. 2 and 3, and for that reason, because the components are the same as those previously identified and described, they are identified by the same reference numerals. The difference between this embodiment and the previously described embodiment is the way in which the grooves which receive the gaskets 24 are formed. These grooves are indicated by the reference numeral 31 and are formed completely by the cylinder liners 12. That is, the cylinder liners 12 have upstanding portions 32 and 33 that are disposed on opposite sides of the grooves 31.

In this embodiment, the upper edge of the portion 33 is slightly lower by the dimension Δh than the upper end of the inner portion 32 adjacent the cylinder bore 13. This ensures that the sealing engagement between the cylinder head and cylinder block will occur closest to the cylinder bore 13.

Figure 5:
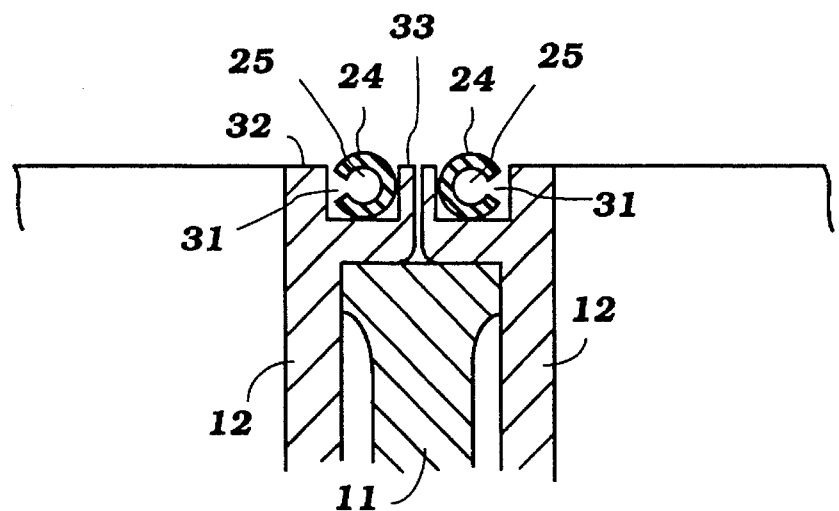
FIG. 5 is a partial cross-sectional view, in part similar to FIGS. 2 and 4, and shows another embodiment of the invention.

FIG. 5 shows an embodiment which is substantially the same as the embodiment of FIG. 4. This embodiment differs from the previously described embodiment in that the upper ends of the liner portions 32 and 33 lie on the same plane. This will be an easier construction to manufacture than the construction of FIG. 4 because separate machining operations are not required on the inner and outer surfaces 32 and 33, respectively.

Figure 6:
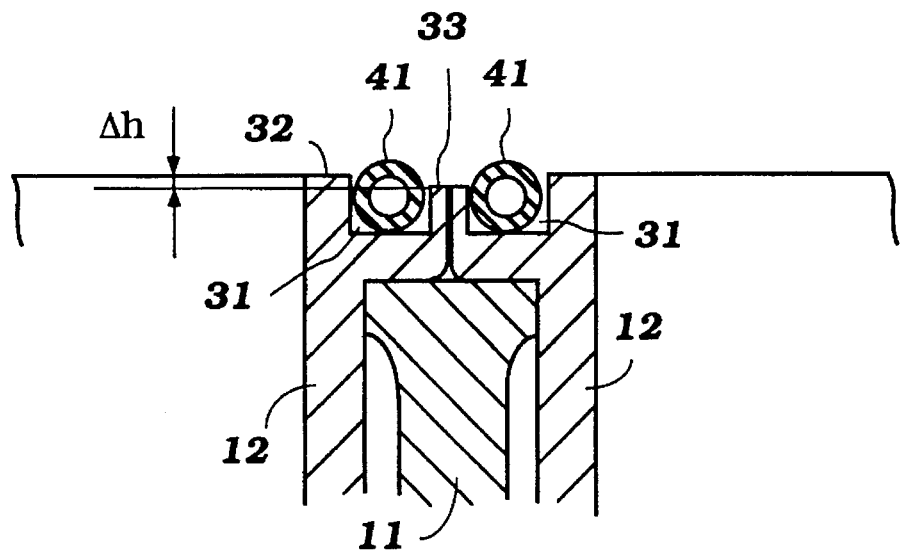
FIG. 6 is a cross-sectional view, in part similar to FIGS. 2, 4, and 5, and shows a fourth embodiment of the invention.

FIG. 6 illustrates another embodiment of the invention which employs the same groove in liner construction as shown in FIG. 4, but employs a different form of cylinder head gasket, indicated by the reference numeral 41. In this embodiment, the cylinder head gaskets 41 are completely tubular in shape and are cylindrical in the as installed condition. These gaskets 41 will be compressed upon insertion of the cylinder head, but because their volume is less than that of the grooves 31, there will be no side thrust exerted on the cylinder liners 12. However, effective sealing will nevertheless be achieved because of the resilient deformation of the gaskets 41.

Figure 7:
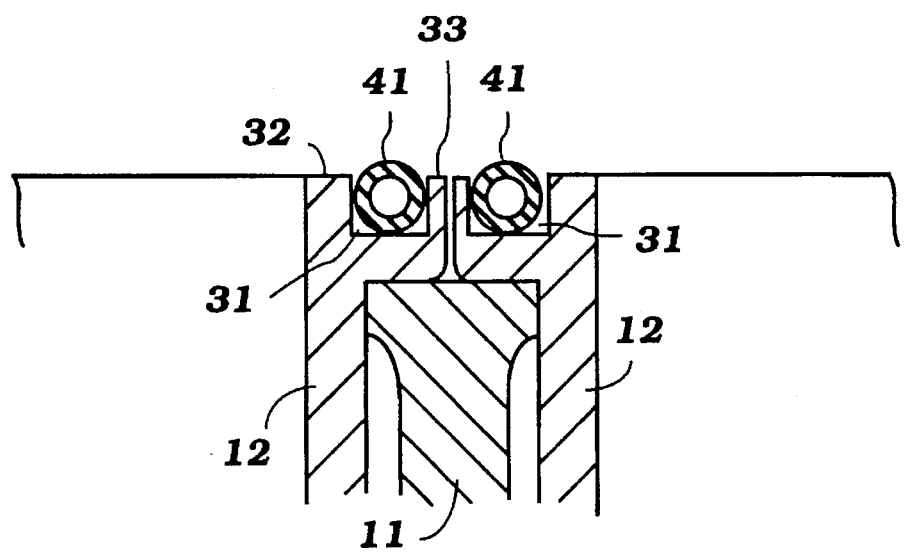
FIG. 7 is a cross-sectional view, in part similar to FIGS. 2, 4, 5, and 6, and shows a fifth embodiment of the invention.

FIG. 7 shows the gaskets 41 of the embodiment of FIG. 6 employed in a groove of the type shown in FIG. 5. For that reason, further description of this embodiment is not believed to be necessary to permit those skilled in the art to understand and practice the invention.

It should be readily apparent from the foregoing description that the described embodiments of the invention are very effective in providing good cylinder head sealing without the likelihood of any side forces being placed on the material in which cylinder head gasket groove is formed. Of course, the foregoing description is that of preferred embodiments of the invention, and various changes and modifications may be made without departing from the spirit and scope of the invention as defined by the appended claims.

I claim:

1. A cylinder head gasket for sealing around a cylinder bore formed in a cylinder block and a cylinder head affixed to said cylinder block in closing relation to said cylinder bore, at least one of said cylinder head and said cylinder block defining a cylindrical groove in which said gasket is compressed and extending around said cylinder bore, said cylinder head gasket comprising a unitary element having a continuous cylindrical shape complementary to said groove for receipt therein and having an open cross section for deformation upon sealing engagement upon assembly of said cylinder head to said cylinder block without placing a side thrust on the wall of said groove surrounding said cylinder bore.

2. A cylinder head gasket as in claim 1, wherein the groove is formed by an inner wall extending around the cylinder bore and an outer wall spaced transversely outwardly relative to the cylinder bore, said inner wall being at least as high as the outer wall for engagement of the cylinder head and cylinder block directly around the cylinder bore.

3. A cylinder head gasket as in claim 2, wherein the inner wall is higher than the outer wall for engagement of the cylinder head and cylinder block only at said inner wall.

4. A cylinder head gasket as in claim 1, wherein the groove is formed in the cylinder block.

5. A cylinder head gasket as in claim 4, wherein the cylinder block comprises a cylinder block element and at least one liner received in the cylinder block element and forming the cylinder bore, the groove being formed at least in part by the liner.

6. A cylinder head gasket as in claim 1, wherein the entire groove is formed in the cylinder liner.

7. A cylinder head gasket as in claim 6, wherein the groove is formed by an inner wall extending around the cylinder bore and an outer wall spaced transversely outwardly relative to the cylinder bore, said inner wall being at least as high as the outer wall.

8. A cylinder head gasket as in claim 7, wherein the inner wall is higher than the outer wall.

9. A cylinder head gasket as in claim 5, wherein the groove is formed in part by the liner and wherein the cylinder block element forms the remainder of the groove.

10. A cylinder head gasket as in claim 9, wherein the groove is formed by an inner wall extending around the cylinder bore and an outer wall spaced transversely outwardly relative to the cylinder bore, said inner wall being at least as high as the outer wall for engagement of the cylinder head and cylinder block directly around the cylinder bore.

11. A cylinder head gasket as in claim 10, wherein the inner wall is higher than the outer wall for engagement of the cylinder head and cylinder block only at said inner wall.

12. A cylinder head gasket as set forth in claim 1 wherein the cylinder head gasket in an uncompressed state is of greater height than the height of said groove but has an effective volume that is less than the volume of the groove when closed upon the cylinder head being affixed to the cylinder block.

13. A cylinder head gasket as in claim 12, wherein the groove is formed by an inner wall extending around the cylinder bore and an outer wall spaced transversely outwardly relative to the cylinder bore, said inner wall being at least as high as the outer wall for engagement of the cylinder head and cylinder block directly around the cylinder bore.

14. A cylinder head gasket as in claim 13, wherein the inner wall is higher than the outer wall for engagement of the cylinder head and cylinder block only at said inner wall.

15. A cylinder head gasket as in claim 12, wherein the groove is formed in the cylinder block.

16. A cylinder head gasket as in claim 15, wherein the cylinder block comprises a cylinder block element and at least one liner received in the cylinder block element and forming the cylinder bore, the groove being formed at least in part by the liner.

17. A cylinder head gasket as in claim 12, wherein the entire groove is formed in the cylinder liner.

18. A cylinder head gasket as in claim 17, wherein the groove is formed by an inner wall extending around the cylinder bore and an outer wall spaced transversely outwardly relative to the cylinder bore, said inner wall being at least as high as the outer wall for engagement of the cylinder head and cylinder block directly around the cylinder bore.

19. A cylinder head gasket as in claim 18, wherein the inner wall is higher than the outer wall for engagement of the cylinder head and cylinder block only at said inner wall.

20. A cylinder head gasket as in claim 16, wherein the cylinder block comprises a cylinder block element and at least one liner received in the cylinder block element and forming the cylinder bore, the groove being formed at least in part by the liner.

21. A cylinder head gasket as in claim 20, wherein the groove is formed by an inner wall extending around the cylinder bore and an outer wall spaced transversely outwardly relative to the cylinder bore, said inner wall being at least as high as the outer wall for engagement of the cylinder head and cylinder block directly around the cylinder bore.

22. A cylinder head gasket as in claim 21, wherein the inner wall is higher than the outer wall for engagement of the cylinder head and cylinder block only at said inner wall.

* * * * *